INVENTOR
HENRY A. ROY, SR.

Dec. 15, 1964    H. A. ROY, SR    3,161,204
BALL VALVES

Filed May 11, 1962    2 Sheets-Sheet 2

INVENTOR
HENRY A. ROY, SR.
BY Duane C. Burton
his Attorney

United States Patent Office 3,161,204
Patented Dec. 15, 1964

3,161,204
BALL VALVES
Henry A. Roy, Sr., 117 Lowell St., Peabody, Mass.
Filed May 11, 1962, Ser. No. 194,106
12 Claims. (Cl. 137—315)

This invention relates generally to ball valves and more particularly to free-floating ball valves having unique annular hemispherically-shaped seal rings.

An essential requirement for all ball valves having a self-centering or floating ball is that the seals or rings must be installed under a predetermined amount of preload in order to prevent leakage through the valve, a particularly acute problem where low pressure differentials are involved. One valve of this type is an end-loaded valve in which the rings and the ball are installed through one end thereof. The rings are preloaded and the ball and rings are held in place by a locking ring. A second valve of this type is a valve having a two-piece or multi-piece housing. Assembly of this type of valve is accomplished by inserting the rings and ball between the pieces and then bolting the pieces together. The bolts serve a dual purpose in that they not only hold the valve together but they also are used to apply the proper amount of preload on the rings. However, both the end-loaded and two-piece or multi-piece valves of the free-floating types suffer from a common disadvantage in that they have to be entirely removed from the piping system for maintenance since assembly or disassembly thereof can not otherwise be accomplished. A third valve of this type is the top-loaded valve. This type of valve can be easily maintained without being first removed from the piping system; however, since the physical size of the valve and the complexity thereof is considerably increased in order to construct a proper functioning valve, the cost of the valve is increased accordingly.

Consequently, the primary object of this invention is to provide an inexpensive, compact, self-centering or free-floating ball valve.

Another object of this invention is to provide a compact, inexpensive, top-loaded, free-floating ball valve of simple design which can be easily assembled or disassembled without being removed from a piping system.

Another object of this invention is to provide a top-loaded, inexpensive, free-floating ball valve having unique annular hemispherically-shaped rings.

Another object of this invention is to provide an inexpensive, top-loaded, free-floating ball valve of simple design having unique annular hemispherically-shaped rings which are mounted, during installation or removal of the ball, for slidable movement in the valve seats such that the force exerted on the ball during assembly causes the rings to position or snap in place under proper preload and during disassembly causes the rings to become disengaged from the ball and move in a direction opposite to the direction of the movement of the ball.

Other and further objects, features and advantages of the invention will appear from the following description.

The invention will now be described in greater detail with reference to the appended drawings, in which.

Figure 1:
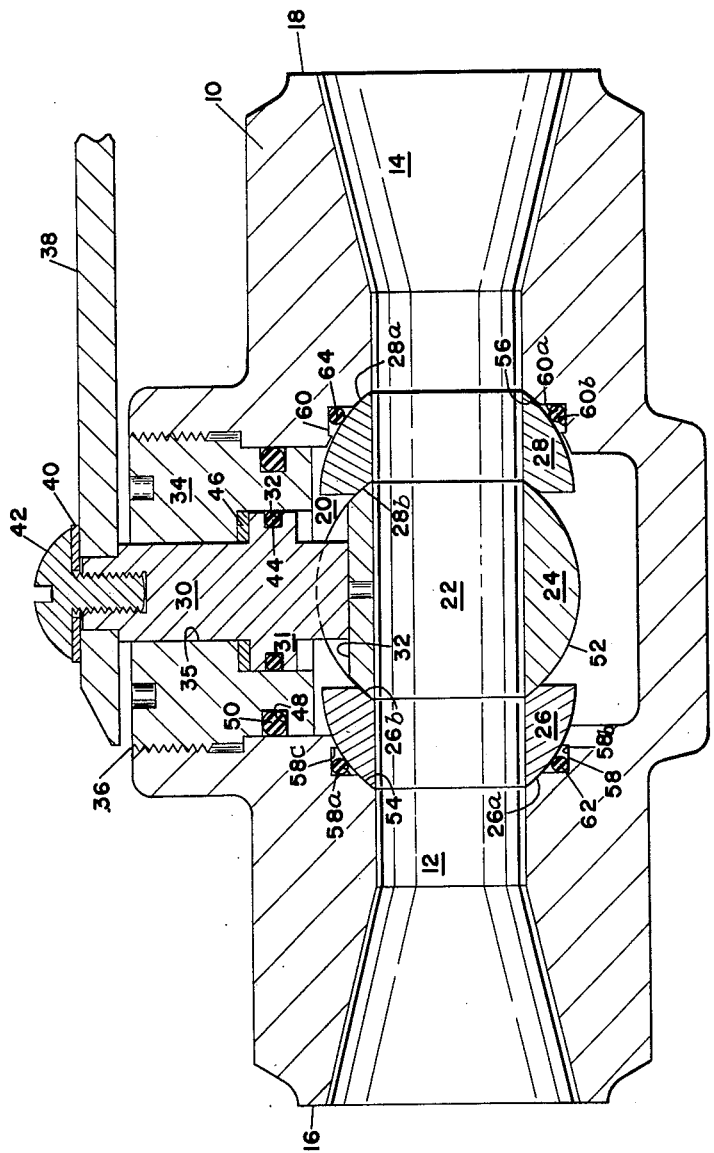
FIG. 1 is a longitudinal sectional view of a preferred form of valve constructed in accordance with this invention.

In one representative embodiment of the invention, as shown in FIG. 1, the valve structure comprises a generally cylindrical single piece housing 10 made of suitable material, such as stainless steel, which has two cylindrical or generally cylindrical fluid passages 12 and 14. The outer ends 16 and 18 of said fluid passages are machined to permit welding of the valve in a pipeline (not shown). Said ends may, however, be internally or externally threaded, flanged or have any other suitable end connection as desired. The fluid passages 12 and 14 communicate with a central space 20 having an axis perpendicular to said passages 12 and 14. The fluid passages 12 and 14 communicate with a passage 22 in a rotatable ball member 24 which is mounted in the central space 20 between two seal rings 26 and 28. A stem 30 is positioned within a keyed slot 32 formed in the top of the ball 24. The stem 30 extends through an opening 35 in the removable bonnet 34 which is threadably mounted in the opening 36 formed in the housing 10. A handle 38 is securely attached to the stem 30 by a lock washer 40 and screw 42.

The stem 30 has a boss portion 31 having an annular groove 33 formed therein. Positioned within this groove 33 is an O-ring 44. The removable bonnet 34 has an opening or vertical bore 35 extending therethrough. Positioned within said opening 35 are an annular thrust washer 46 and the stem 30. Also formed within said removable bonnet 34 is an annular groove 48 in which is positioned an O-ring seal 50. O-rings 44 and 50 prevent leakage between the stem 30 and the bonnet 34 and between the housing 10 and the bonnet 34, respectively.

Stops (not shown) included as an integral part of the housing 10 cause interference with a portion (not shown) of the handle 38 as said handle is rotated to position the rotatable ball member 24. Said stops are positioned such that interference with the handle 38 occurs when the fluid passage 22 within the ball 24 is aligned with the fluid passages 12 and 14 (opened position) and when said fluid passages 22 within said ball 24 extends across said fluid passages 12 and 14 (closed position).

The ball member 24 is shown in FIG. 1 having a fluid passage 22 therethrough, the length of which is less than the diameter of the ball 24. The ball 24 has an outer convexly-curved surface portion 52 which engages one axial end of each of the seal rings 26 and 28 when the valve member is in the opened and closed position.

Formed within the housing 10 are two valve seats 54 and 56, each comprising an annular hemispherical surface, one of each being located adjacent to and concentric with the inlet and outlet fluid passages into and out of, respectively, the housing's central space or cavity 20. The hemispherically-shaped surface of each valve seat, particularly the seat formed adjacent to the discharge or downstream fluid passage, preferably has an annular groove 58, 60 formed therein. Positioned within each of these annular grooves is a separate seal means such as an O-ring 62, 64. If the annular groove is formed only in the downstream valve seat 56, it need only comprise a radially extending surface 60a and an axially extending surface 60b, both said surfaces which meet along a common circular line, since the radially extending surface 60a sufficiently precludes the O-ring 64 from being extruded out of the groove 60. However, if an O-ring is positioned within the upstream valve seat, it is additionally desirable, particularly where high pressures are encountered, to form the upstream annular groove comprising two radially extending surfaces 58a and 58c connected by an axially extending surface 58b. The radially extending surface 58c prevents the O-ring 62 from being extruded out of the annular groove 58, particularly where high pressures are encountered.

An important aspect of the invention concerns the construction of the seal rings which are simple in design, inexpensive to manufacture and have a long operating life. The seal rings may be formed from any suitable material such as hard rubber, elastomer or metal. The seal rings 26 and 28 shown in FIG. 1, comprise an annular hemispherically-shaped seal member having a rear face comprising an outer convexly-curved portion 26a and 28a mounted for slidable movement as well as sealing engagement with the hemispherically-shaped portion of the valve seat, and a front face comprising an inner concavely-curved portion 26b and 28b mounted for sealing engagement with the outer convexly-curved portion 52 of ball 24. The diameter of the hemispherically-shaped seal ring is preferably smaller than the diameter of the hemispherically-shaped surface of the valve seat. (See valve seat 56 and ring 28 in FIG. 1.) This mismatch of the respective surfaces makes it easier to obtain a better sealing contact between the valve seat and the ring since the same force is now distributed over a smaller bearing area. Since the seal rings must be installed under preload, the combined length of the ring-ball-ring unit prior to assembly must be greater than the distance separating the valve seats.

Figure 4:
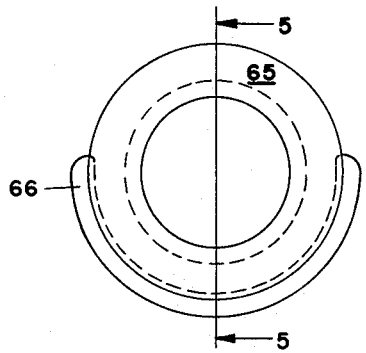
FIG. 4 is a rear elevational view of one preferred embodiment of a ring constructed in accordance with this invention.
Figure 5:
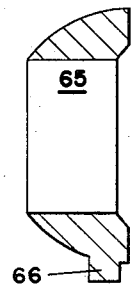
FIG. 5 is a sectional view of the ring shown in FIG. 4 taken along line 5—5.

Another preferred form for this unique seal ring is shown in FIGS. 4 and 5. The seal ring 65 includes means for restricting the motion of the seal ring within the valve seat during the installation of the ball 24. The means as shown comprise a semi-circular, radially extending flange or boss portion 66 formed on the portion of the ring positioned farthest from the opening 36 in the housing 10.

Figure 6:
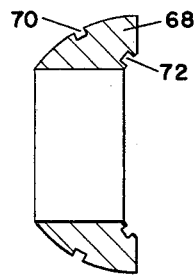
FIG. 6 is a sectional elevational view of another preferred embodiment of a seal ring constructed in accordance with the present invention.

Another preferred form for the seal ring is shown in FIG. 6. The seal ring 68 has annular grooves 70 and 72 formed in the rear and front faces, respectively. O-rings (not shown) may be positioned within these annular grooves. This form is particularly beneficial in applications where the seal ring is formed from a hard unyielding material such as any one of several metals. The use of O-rings within the annular grooves effectively prevent leakage through the valve, particularly between the ball 24 and the downstream valve seat. When a seal ring of this type is used, there is no necessity to use a valve structure having annular grooves formed within the hemispherically-shaped surface of the valve seats.

Figure 2:
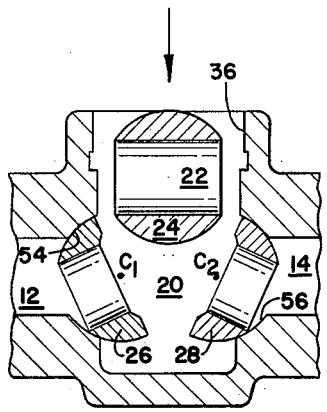
FIG. 2 is a longitudinal sectional view of a partially assembled valve constructed in accordance with this invention showing the ball and rings in a partially assembled position.
Figure 3:
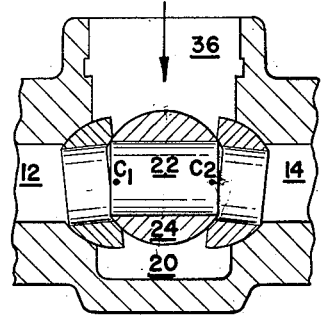
FIG. 3 is a longitudinal sectional view of a partially assembled valve constructed in accordance with this invention showing the ball and rings in a nearly assembled position.

Assembly of the valve is accomplished by inserting O-rings 62 and 64 into the annular grooves 58 and 60 within the valve seats 54 and 56. Next, the seal rings 26 and 28 are inserted through the opening 36 of the housing 10 into the central space or bore 20. Each ring 26, 28 is positioned in a respective one of the valve seats 54, 56 as shown in FIG. 2. Prior to the positioning of the ball 24 in the final assembled condition, the portion of the seal rings 26 and 28 positioned farthest from the opening 36 is in closer proximity to each other than the portion of each ring positioned nearest said opening 36. The ball 24 is then inserted through the opening 36. The ball is mounted in the open position, i.e., the fluid passage 22 of the ball 24 being aligned in communication with the fluid passages 12 and 14. The ball 24 is urged downward into the bore or central space 20 until its outer convexly-curved portion 52 firmly engages the inner concavely-curved portion 26b and 28b of the seal rings 26 and 28. As greater force is applied to the ball 24, the ball continues to move downward into the central space 20 and the seal rings 26 and 28 moves slidably within the valve seats so as to rotate about points C1 and C2, respectively. The rings 26 and 28 move from the positions shown in FIGURES 2 and 3, wherein the planar faces of the rings are at an angle to the axis of the passage, to the final position shown in FIGURE 1, wherein the planar faces of the rings are perpendicular to the axis of the passage and parallel to the axis of the bore 20. Final positioning of the ball 24 and seal rings 26 and 28 in the assembled condition is obtained by rotating the ball ninety degrees while still urging same in the downward direction. Such rotation may be accomplished by using the stem 30 mounted to the handle 38 or by using a screwdriver (not shown). Next, O-ring 50 is installed within annular groove 48 in the removable bonnet 34 and O-ring 44, annular bushing 46 and stem 30 are installed within the bonnet's bore or opening 31. The bonnet assembly is then threaded into the opening 36 and the stem 30 is adjustably positioned until it is securely seated within the ball's keyed slot 32. The handle 38 is then securely attached to the stem by the lock washer 40 and screw 42. The valve is now completely assembled and ready for installation within a pipe line. Disassembly of the valve may be accomplished whether or not the valve is installed in a pipe line without the necessity of first removing same from said pipe line, by reversing the steps outlined above.

It will readily be appreciated that a valve having a seat seal simple and compact in design, easy to assemble, disassemble and maintain, and inexpensive to manufacture has been described. It is to be understood that this invention is not limited to the exact embodiment of the device shown, which is merely by way of illustration and not limitation, as various other forms and modifications will be apparent to those skilled in the art. For example, annular grooves may be installed either within the valve seat or within the rear face of the seal ring without affecting the operation of the valve.

I claim:

1. A valve comprising:
    (a) a housing having
        (1) aligned inlet and outlet ports,
        (2) means defining a bore having an axis perpendicular to a line passing through the center of said ports, and
        (3) a pair of annular valve seats, one of each being disposed adjacent to and concentric with each said port, each of said valve seats comprising an annular hemispherical surface;
    (b) a rotatable ball disposed within said bore and having a fluid passage arranged in one rotational position of said ball to provide communication between said ports, said ball in another rotational position thereof being arranged to prevent communication between said port; and
    (c) a pair of rings each having an annular hemispherical surface and a planar face, each of said rings, during the assembled condition of the valve, being mounted in a respective one of said valve seats to hold said ball therebetween, each of said rings, during installation or removal of said ball in said bore, being mounted for slidable movement in a respective one of said valve seats, whereby the planar faces of said rings move from a position at an angle with a line passing through the centers of said ports to a final position parallel to the axis of said bore.

2. A valve as described in claim 1 including a seal means, said seal means being interposed between the valve seat formed adjacent to and concentric with the outlet port and the ring positioned therein.

3. A valve as described in claim 1 including a pair of seal means, one of each being interposed between each valve seat and the ring positioned therein.

4. A valve as described in claim 3 in which said pair of seal means comprises a pair of O-rings.

5. A valve as described in claim 1 including means for limiting, during the installation of said ball in said bore, the movement of said rings.

6. A valve as described in claim 1 in which each said valve seat comprises an annular hemispherical surface having an annular groove formed therein, and a pair of seal means, one of each seal means being positioned within a respective one of said annular grooves.

7. A valve as described in claim 6 in which each said annular groove comprises an annular radially extending surface and an annular axially extending surface, both surfaces which cojoin along a common substantially circular line.

8. A valve as described in claim 6 including means for limiting, during the installation of said ball in said bore, the movement of said rings.

9. A valve as described in claim 8 in which said pair of seal means comprises a pair of O-rings.

10. A valve as described in claim 1 in which the radius of curvature of the valve seats is larger than the radius of curvature of the rings.

11. A valve as described in claim 1 in which said rings have an annular groove formed in the surface which comes into sealing engagement with the valve seat and the surface which comes into sealing engagement with the rotatable ball.

12. In a free floating ball valve assembly having a valve housing, a pair of spaced hemispherical valve seats formed in and longitudinally spaced of said housing and defining an inlet port and an outlet port, a ball valve member, means for positioning said ball valve within said housing between said inlet and outlet ports in preloaded sealing relation therewith, said positioning means including a lateral opening in said housing for insertion of said ball valve, first and second compressible seating rings, each of said seating rings including a hemispherical sealing surface in slidable engagement with one of said hemispherical valve seats, and a planar sealing surface on each said seating ring for engagement with said ball valve, whereby said seating rings may be angularly positioned for reception of said ball valve and forced by said ball valve to return to full seating engagement between said valve seats and said ball valve with a seal being formed between said hemispherical valve seat and hemispherical portion of said seating ring and a seal being formed between said ball valve and said planar surface of said seating ring.

References Cited in the file of this patent
UNITED STATES PATENTS
3,038,489    Allen _____ June 12, 1962
FOREIGN PATENTS
856,676    Great Britain _____ Dec. 21, 1960